United States Patent
Striemer (10) Patent No.: US 7,953,789 B2
(45) Date of Patent: May 31, 2011

(54) WHO, WHAT, WHERE, WHEN INFORMATION SUPPLY FACILITY

(75) Inventor: Bryan Lester Striemer, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 2821 days.

(21) Appl. No.: 10/236,727

(22) Filed: Sep. 6, 2002

(65) Prior Publication Data

US 2004/0064566 A1    Apr. 1, 2004

(51) Int. Cl.
- *G06F 15/16* (2006.01)
- *G06F 3/14* (2006.01)
- *G06F 3/00* (2006.01)
- *G06F 3/048* (2006.01)
- *G06Q 30/00* (2006.01)

(52) U.S. Cl. ........ 709/203; 709/204; 709/206; 709/237; 709/249; 715/758; 715/864; 705/14.58; 705/14.65; 705/14.66

(58) Field of Classification Search .......... 709/203–207, 709/227, 228, 237, 249; 715/744, 758, 867, 715/864; 705/14.38, 14.5, 14.58, 14.64–14.67
See application file for complete search history.

(56) References Cited

U.S. PATENT DOCUMENTS

| | | | |
|---|---|---|---|
| 5,812,865 A * | 9/1998 | Theimer et al. | 709/228 |
| 6,112,186 A * | 8/2000 | Bergh et al. | 705/10 |
| 6,377,793 B1 | 4/2002 | Jenkins | |
| 6,427,170 B1 * | 7/2002 | Sitaraman et al. | 709/226 |
| 6,509,828 B2 * | 1/2003 | Bolavage et al. | 340/10.1 |
| 6,564,261 B1 * | 5/2003 | Gudjonsson et al. | 709/227 |
| 6,650,887 B2 * | 11/2003 | McGregor et al. | 455/406 |
| 6,832,242 B2 * | 12/2004 | Keskar | 709/204 |
| 6,931,429 B2 * | 8/2005 | Gouge et al. | 709/203 |
| 6,937,867 B2 * | 8/2005 | Oda et al. | 455/456.1 |
| 6,952,581 B2 * | 10/2005 | Sasada et al. | 455/432.3 |
| 7,050,815 B2 * | 5/2006 | I'Anson et al. | 455/456.1 |
| 7,113,917 B2 * | 9/2006 | Jacobi et al. | 705/14.53 |
| 7,167,910 B2 * | 1/2007 | Farnham et al. | 709/223 |
| 7,203,752 B2 * | 4/2007 | Rice et al. | 709/225 |

(Continued)

FOREIGN PATENT DOCUMENTS

WO    WO 01/80499 A2    10/2001

OTHER PUBLICATIONS

Albrecht, Markus, et al. "IP Services over Bluetooth: Leading the Way to a New Mobility," Proceedings Annual Conference on Local Computer Networks, 1999, XP-001001314, pp. 2-11.*

(Continued)

*Primary Examiner* — Ian N Moore
*Assistant Examiner* — Melvin H Pollack
(74) *Attorney, Agent, or Firm* — Steven W. Roth; Roy W. Truelson (57) ABSTRACT

Disclosed is an Information Supply Facility. The Information Supply Facility utilizes a personal/hand held device that transparently interacts (via various access points) with a centralized server. The server collects identification and location information about the personal device and makes a determination as to whether the person associated with the device should be notified regarding the proximity of other individuals and/or regarding one or more topics of interest to the particular person. The collected information along with certain profile information is stored in a database where it can be made available to third parties (e.g., governmental entities) for tracking and notification purposes.

36 Claims, 8 Drawing Sheets

U.S. PATENT DOCUMENTS

| | | | | |
|---|---|---|---|---|
| 7,346,022 | B1* | 3/2008 | Roy | 370/328 |
| 7,356,040 | B2* | 4/2008 | Parra-Moyano et al. | 370/422 |
| 7,430,422 | B2* | 9/2008 | Nagatsuma et al. | 455/456.3 |
| 7,433,682 | B1* | 10/2008 | Moll et al. | 455/414.1 |
| 7,454,464 | B2* | 11/2008 | Puthenkulam et al. | 709/204 |
| 7,487,112 | B2* | 2/2009 | Barnes, Jr. | 705/26 |
| 7,752,337 | B1* | 7/2010 | O'Brien et al. | 709/249 |
| 2001/0048449 | A1* | 12/2001 | Baker | 345/758 |
| 2002/0068584 | A1* | 6/2002 | Gage et al. | 455/456 |
| 2002/0116458 | A1* | 8/2002 | Bricklin et al. | 709/204 |
| 2002/0174188 | A1* | 11/2002 | Clark et al. | 709/213 |
| 2003/0016636 | A1* | 1/2003 | Tari et al. | 370/328 |
| 2003/0032404 | A1* | 2/2003 | Wager et al. | 455/406 |
| 2003/0046164 | A1* | 3/2003 | Sato et al. | 705/14 |

OTHER PUBLICATIONS

Leonhardt, Ulf and Magee, Jeff. "Towards a General Location Service for Mobile Environments," Proceedings of IEEE Workshop on Services in Distributed and Networked Environments, 1996, pp. 1-8.*

Honcharneko, W. et al. "Broadband Wireless Access," IEEE Communications Magazine, vol. 35, Issue 1, Jan. 1997, pp. 20-26.*

Sun, Jun-Zhao and Sauvola, Jaakko. "Mobility and Mobility Management: A Conceptual Framework," Proceedings of the 10th International Conference on Networks, 2002, pp. 205-210.*

Haas, Zygmunt J. and Tabrizi, Siamak. "On Some Challenges and Design Choices in Ad-Hoc Communications," 1998.*

Heath, Robert. "New Communication Technologies: An Issues Management Point of View." Public Relations Review, vol. 24, Issue 3, 1998, pp. 273-288.*

Albrecht et al., "IP Services Over Bluetooth: Leading the Way to a New Mobility," Proceedings Annual Conference on Local Computer Networks, 1999, XP-001001314, pp. 2-11.

Racherla et al., "Security and Privacy Issues in Wireless and Mobile Computing," IEEE Publication, Dec. 17, 2000, XP-010534105, pp. 509-513.

Bhagwat et al., "BlueSky: A Cordless Networking Solution for Palmtop Computer," Proceedings of the 5th Annual ACM/IEEE International Conference on Mobile Computing and Networking, Aug. 15-20, 1999, Seattle, WA; Annual ACM/IEEE International Conference on Mobile Computing and Networking, New York, NY; Aug. 15, 1999, XP-000896073, pp. 69-76.

* cited by examiner

| USERID: SAMD@xyz.com | PASSWORD: ******* | | |
|---|---|---|---|
| WHO | WHAT | WHERE | WHEN |
| Mom | Exercise | Vegolli's Resturant | 07/29/02;21:00-22:30 |
| Dad | Wallpaper | City Park Baseball Field | 07/29/02;19:30-20:30 |
| Best Friend | Skating | ABC Discount Center | 07/29/02;18:45-19:10 |
| Boss | CPR | Athletic Club | 07/29/02;17:15-18:15 |
| | Emergency | XYZ Corporation | 07/29/02;13:00-17:00 |
| | | County Government Center | 07/29/02;12:15-12:30 |
| | | XYZ Corporation | 07/29/02;0800-1200 |

FIGURE 6

WHO, WHAT, WHERE, WHEN INFORMATION SUPPLY FACILITY

FIELD OF THE INVENTION

The present invention relates to data processing systems. More particularly, the present invention relates to short-range wireless communication facilities.

BACKGROUND OF THE INVENTION

It is well understood that communication between individuals is an essential component of past and present society. Indeed, the human race has felt the need to communicate since the beginning of time. Ideas and facts were initially saved for future use through crude symbols written on cave walls. The widespread use of paper then became possible/popular and remains so today. Recently, electronic storage of written material has become prevalent. Early forms of more remote communications include the smoke signals of the early American Indians and the drums of African tribes. Today high-speed links carry audio, video, and data signals at rates that were thought impossible only a few short years ago. These high-speed links come in the form of fiber optic cables, satellite systems, and wireless facilities such as cellular technology.

Of more importance, though, is the extent to which today's communication technology is available to the populace. The vast majority of the world's population centers have unfettered access to most, if not all, of the most important communication links. More rural areas have access to some of the more important physical communications links, and in many cases, to cellular technology as well. Indeed, even individuals in the most remote areas can use a satellite phone to contact another person.

However, despite this tremendous communication capability, we are still in some ways a disconnected population. An avid coin collector can sit next to another avid coin collector at a bus depot and never learn of the shared interest. A do it yourselfer buying paint never learns that the paint store also sells wallpaper which could be used for the next project. Government officials are unable to adequately track the whereabouts of their citizens when responding to natural and non-natural disasters. Public health organizations are unable to identify and notify individuals who have been potentially exposed to a recently discovered food or environmental contaminant.

No matter how well connected a community or society may be, the need for better communication capabilities will always exist.

SUMMARY OF THE INVENTION

Disclosed is a method, apparatus, and program product which each provide a new and novel short-range communication facility. The facility is dubbed W4, which stands for Who, What, Where, and When. W4 utilizes a personal/handheld device that transparently interacts (via various access points) with a centralized server. The server collects identification and location information about the personal device and makes a determination as to whether the person associated with the device should be notified regarding the proximity of other individuals and/or regarding a topic of interest to the particular person. The collected information along with certain profile information is stored in a database where it can be made available to third parties (e.g., governmental entities) for tracking and notification purposes.

DESCRIPTION OF THE PREFERRED EMBODIMENT

Overview

The preferred embodiment relates to electronic devices using a local wireless interface, such as Bluetooth or IEEE 802.11. To understand the context of the invention, a general discussion of two standards for wireless communication is provided below.

Bluetooth

Bluetooth is a worldwide specification for a small-form factor, low-cost solution for linking between mobile computers, mobile phones, other portable handheld devices to one another, and to the Internet. The specification is developed, published and promoted by the Bluetooth Special Interest Group (SIG).

Bluetooth wireless technology is unique in its breadth of applications. Links can be established between groups of products simultaneously or between individual products and the Internet. While point-to-point connections are supported, the specification allows up to seven simultaneous connections to be established and maintained by a single radio. This flexibility, combined with strict interoperability requirements, has led to support for Bluetooth wireless technology from a wide range of market segments, including software developers, silicon vendors, peripheral and camera manufacturers, mobile PC manufacturers and handheld device developers, consumer electronics manufacturers, car manufacturers, and test and measurement equipment manufacturers.

Hardware that complies with the Bluetooth wireless specification ensures communication compatibility worldwide. Bluetooth is generally designed to operate in a maximum range of one to one hundred meters, depending on the class of the device. Class 1 devices typically transmit in the 1 milliwatt (mW) to 100 mW range, resulting in a range up to 100 meters. Class 2 devices typically transmit in the 250 microwatt (uW) to 2.5 mW range, resulting in a range up to ten meters. Class 3 devices typically transmit less than 250 uW, resulting in a range up to 1 meter.

Devices enabled with Bluetooth wireless technology will be able to: free electronic accessories and peripherals from wired connections; exchange files, business cards, and calendar appointments; transfer and synchronize data wirelessly; take advantage of localized content services in public areas; and function as remote controls, keys, tickets and e-cash wallets.

Many manufacturers of electronic devices are planning to integrate Bluetooth into their devices so their devices can automatically connect to other Bluetooth devices. One goal of Bluetooth is to interconnect many electronic devices without using hard-wire cables. For example, a computer network that includes four computer systems, four monitors, a printer, and a scanner could theoretically be all interconnected via Bluetooth without using any cables.

Unlike many other wireless standards, the Bluetooth wireless specification includes both link layer and application layer definitions for product developers. Radios that comply with the Bluetooth wireless specification operate in the unlicensed, 2.4 GHz radio spectrum ensuring communication compatibility worldwide. These radios use a spread spectrum, frequency hopping, full-duplex signal at up to 1600 hops/sec. The signal hops among 79 frequencies at 1 MHz intervals to give a high degree of interference immunity.

The 2.4 GHz band used by Bluetooth is unlicensed, and can be used by many other types of devices such as cordless phones, microwave ovens, and baby monitors. Any device designed for use in an unlicensed band should be designed for robustness in the presence of interference, and the Bluetooth wireless technology has many features that provide such robustness.

Other Wireless Standards

There are other wireless standards that exist besides Bluetooth. For example, Wi-Fi (IEEE 802.11b) is designed to provide wireless Ethernet connectivity that can extend or replace wired networks for dozens of computing devices. Wi-Fi is a trademark of WECA (the Wireless Ethernet Compatibility Alliance). The Bluetooth wireless technology is expected to be used widely as a cable replacement for devices such as PDAs, cell phones, cameras, speakers, headsets and so on. IEEE 802.11 will likely still be used for higher speed wireless Ethernet access, so it is widely expected that Bluetooth and 802.11 will co-exist. Preliminary tests by the Pennsylvania State University's Applied Research Laboratory show that Bluetooth and 802.11b (Wi-Fi) do not interfere with each other even in close proximity. IEEE 802.11(b)'s typical 284-foot range was unaffected by the presence of Bluetooth devices, while Bluetooth's typical 64-foot range was unaffected by the presence of 802.11 (b) devices.

Another short-range wireless protocol that could be used is an emerging standard called ZigBee. Zigbee originated as a scaled down version of the HomeRF specification. ZigBee operates in the 2.5-GHz band and is based upon direct spread-spectrum technology. Yet another short-range protocol that could be used in the preferred embodiment is called i-Bean. i-Bean, which is a proprietary protocol of Millennial Net, Inc., uses 916 MHz in the U.S., 434 MHz in Europe and 429.5 MHz in Japan. I-Bean operates at 115 kbits/sec, which, while slower than Bluetooth, would be adequate for the purposes of the preferred embodiment.

DETAILED DESCRIPTION

Figure 1:
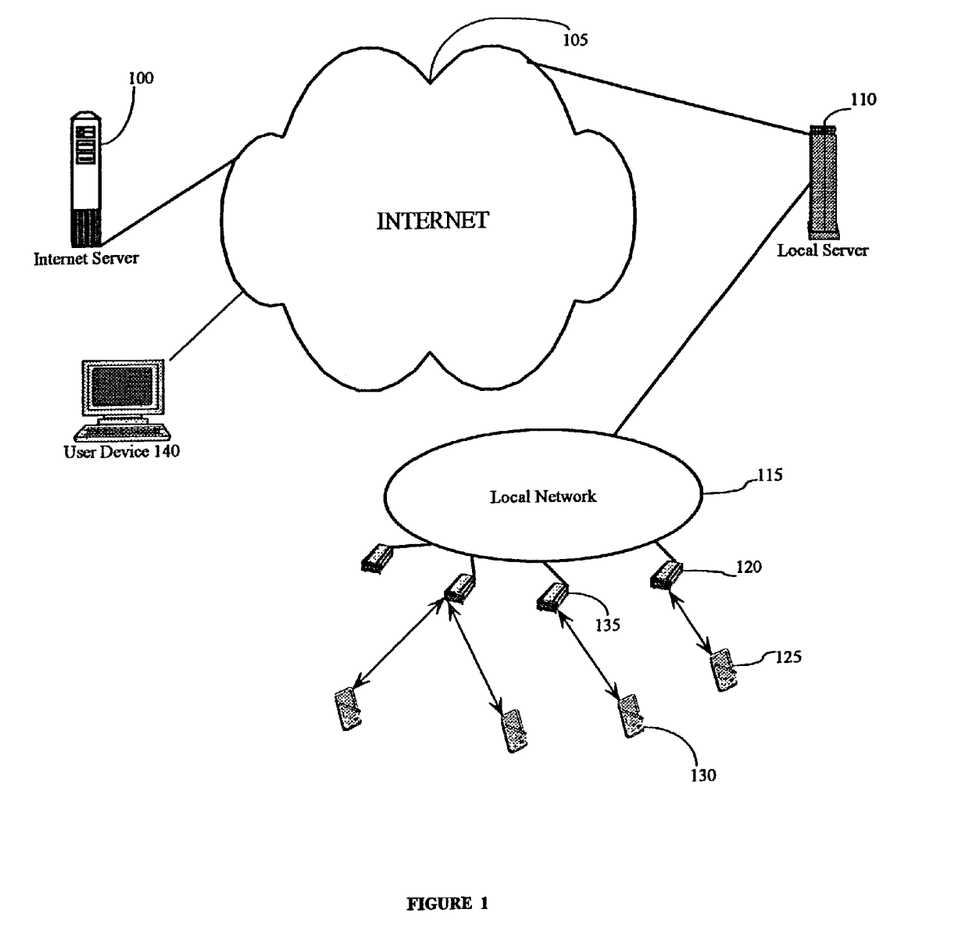
FIG. 1 is a block diagram of the network topology used in the preferred embodiment of the present invention.

Turning now to the drawings, FIG. 1 shows the network topology used in the preferred embodiment to provide the Information Supply Facility of the present invention. The preferred embodiment of the Information Supply Facility of the present invention is referred to herein as the W4 Facility.

Figure 3:
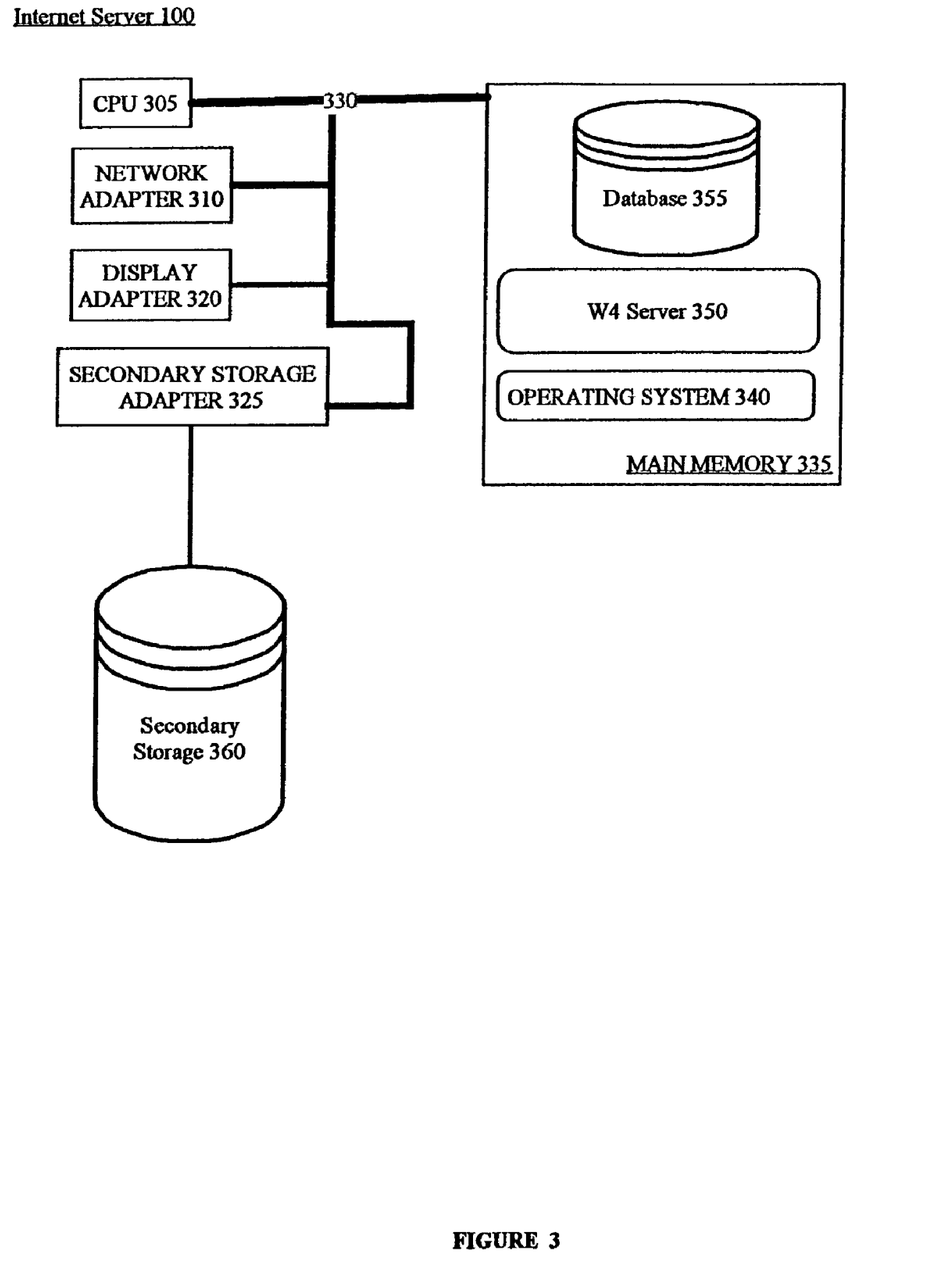
FIG. 3 is a block diagram showing some of the internal components of the centralized server of the preferred embodiment of the present invention.

As shown, network 105, the Internet in the preferred embodiment, is used to interconnect several other network entities. Internet Server 100, which is shown in more detail in FIG. 3, is the centralized server used in the preferred embodiment to manage and store profile and activity records (see FIG. 5 and the associated text) and to process these records to provide much of the W4 function. Also connected to network 105 are User Device 140 and Local Server 110. Within the preferred embodiment, User Device 140 is used to create and update profile information for ultimate storage (as a Profile Record) on Internet Server 100. Local Server 110 is an on-premises server that is used to initiate W4 processing for Local Network 115 and to provide Local Network 115 with access to network 105. Local Network 115 in turn provides connectivity for several access points.

The access points used in the preferred embodiment are sold by Pico Communications™ Inc under the trade name PicoBlue™. The PicoBlue™ access server provides Bluetooth connectivity from 30 to 100 meters via a built-in Bluetooth radio. Other types of access points could be used in the preferred embodiment. Access Points 120 and 135 are shown on FIG. 1 as examples. Access points are used to communicate, via the Bluetooth protocol, with one or more handheld devices.

The handheld devices used in the preferred embodiment are Palm™ handhelds, but other Bluetooth enabled handhelds could also be used. For example, the Ericsson™ T68 and Nokia™ 6310 phones could alternatively be used.

Figure 2A:
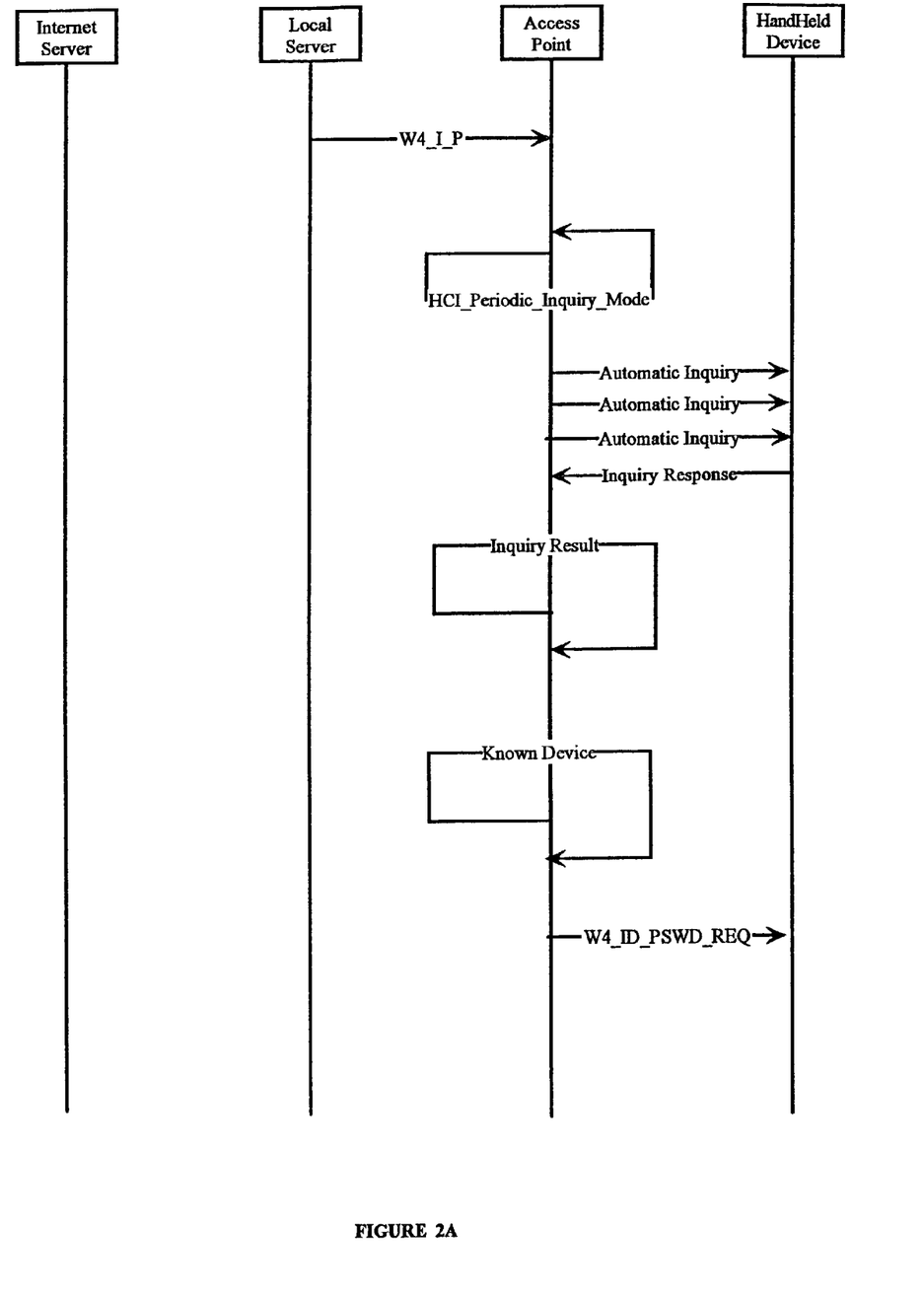
FIGS. 2A and 2B are message flow diagrams that show the various messages that are passed between the various entities of the preferred embodiment of the present invention.
Figure 2B:
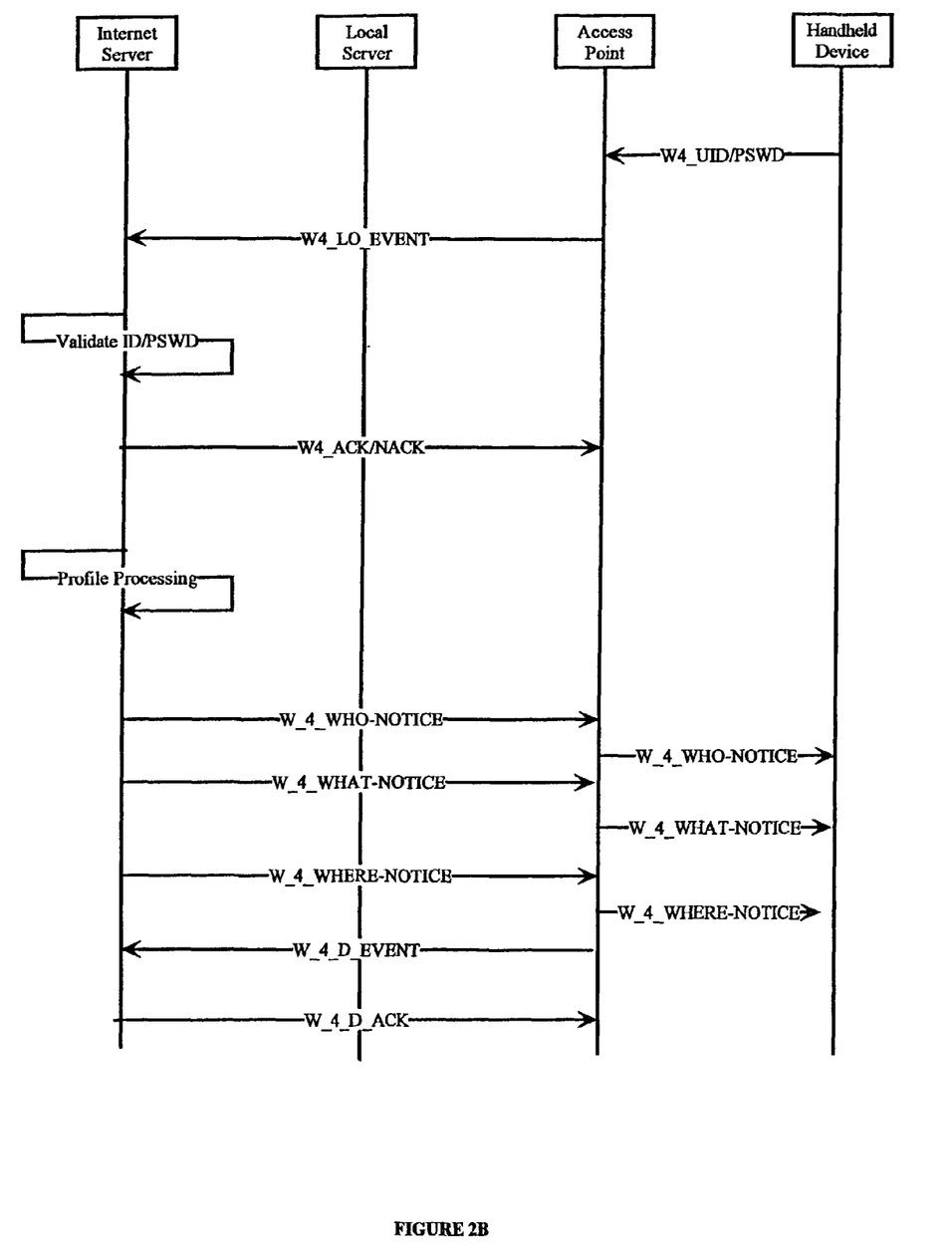

FIGS. 2A and 2B are message flow diagrams that are used herein to describe the intra-entity message passing that is used in the preferred embodiment. Treatment of internal processing within the entities is only touched upon here. Additional details are provided in subsequent pages of this patent.

As shown on FIG. 2A, Local Server 110 initiates W4 processing by sending the W4_I_proc message to each access point. In addition to including a commence processing request, the W4_I_proc message also includes the Domain name of Internet Server 100. The access point (e.g., access point 120), as part of its programming, responds by issuing the Bluetooth HCI_Periodic_Inquiry_Mode Command to its built in Bluetooth radio. As stated in section 4.5.3 of the Bluetooth Specification, this command is used to configure the radio to enter the Periodic Inquiry Mode. The radio responds by repeatedly transmitting Bluetooth Automatic Inquiries (note the three Automatic Inquiries depicted on FIG. 2A). When a Bluetooth capable device comes into range of the access point, 30-100m depending upon environmental conditions, its Bluetooth radio will receive an Automatic Inquiry and respond with the Bluetooth Inquiry Response message (see FIG. 2A). The built-in Bluetooth radio of the access point then reports receipt of the Inquiry Response by issuing a Bluetooth Inquiry Result event to the access point. The access point then makes a determination as to whether the device is already known to it or not. This determination is made within the access point by maintaining a log (not shown) of handheld device identifiers. The log includes an entry for each handheld device. Each entry includes the device identifier for the handheld device, the user ID provided by the device (see below), and a timestamp that indicates the time at which the access point was last in contact with the particular handheld device. These addresses are surfaced to the access point via the BD_ADDR parameter in the Inquiry Result event.

If the handheld device is known to the access point, the access point simply updates the timestamp associated with the handheld device. The timestamp is used by the access point to keep the log fresh (i.e., by deleting older entries).

However, if the handheld device is unknown to the access point (i.e., if the identifier of the handheld device is not present within the access point's log), the access point sends a W4_ID_PSWD_REQ message to the handheld device. This message prompts the device to respond with its pre-configured user ID and password (see FIG. 2B). In the preferred embodiment, the user ID is an Email address of the user of the handheld device, although other schemes could be used. (Specifics as to how this information is provided to the handheld device and how the device is programmed to automatically respond to the W4_ID_PSWD_REQ with the requested log-on information are implementation details and are not provided here. Those skilled in the art will appreciate that it would be a simple matter to program a Palm handheld or other type of handheld device to provide this function.) The access point receives the W4_UID/PSWD message from the handheld, stores the user ID and a timestamp in its log, and relays the log-on information to Internet Server 100. This information is sent to Internet Server 100 in the form of a W4_LO_Event.

The W4_LO_Event of the preferred embodiment includes the following information: access point ID, access point description, access point Domain name, and user log-on information (i.e., user ID and password). The access point ID is used by Internet Server 100 to track which handheld devices are active at which access points (see discussion of Activity Records—FIG. 5). The access point Domain name is used by Internet Server 100 to communicate with the sending access point. The access point description is used in connection with WHERE-NOTICE processing, which is explained in the text accompanying FIG. 4B. Internet Server 100 uses the log-on information to authenticate the user relative to the W4 Facility.

If the user is authenticated, a user entry is added to the Activity Record associated with the sending access point. Internet Server 100 then sends a W4_ACK/NACK message back to the access point. The W4_ACK/NACK includes the user ID and an indication as whether the user was authenticated relative to the W4 Facility. If the access point receives a negative acknowledgement, the access point marks the handheld device's entry in its log so that W4_LO_Events are not continually generated and so that a W4_D_Event is not sent when the access point loses contact with particular handheld device. If a positive acknowledgement is received, the user is logged on to the W4 Facility, meaning that the user's handheld device can now receive W4 notices (i.e., WHO, WHAT, and WHERE notices).

Returning now to the processing of Internet Server 100 (still FIG. 2B), and assuming that the user has been authenticated relative to the W4 Facility, Internet Server 100, after sending the positive acknowledgement via the W4_ACK/NACK message, processes the user profile to determine if a W4 message should be sent to the user via their handheld device. Here we are discussing WHO and WHAT notices, which are primarily described in more detail later in the text accompanying FIG. 4A. WHERE notices, which are handled differently, are primarily described in the text accompanying FIG. 4B. Nevertheless, examples of W4 WHO, WHAT, and WHERE notices can be seen on FIG. 2B. As shown, these notices are first sent to the access point by Internet Server 100 and then sent on to the handheld device by the access point.

Eventually, the access point will send a W4_D_Event to Internet Server 100. This event indicates that the access point is no longer in contact with a particular handheld device. The loss of contact will naturally occur when a handheld device is moved out of range of the access point, is turned off by its user, or fails for some reason. The access point maintains a view of active handheld devices by periodically removing older entries from its log. When an entry is to be removed, the access point sends a W4_D_Event to Internet Server 100. The W4_D_Event includes the access point ID and the user ID associated with the handheld device. Internet Server 100 updates the appropriate activity record and sends an acknowledgement to the access point (i.e., a W4_D_Ack message).

FIG. 3 is a block diagram showing some of the internal components of the centralized server of the preferred embodiment of the present invention. Shown is a block diagram of Internet Server 100 of the preferred embodiment of the present invention. Internet Server 100 is an enhanced IBM iSeries eServer computer system. As shown in the exploded view of FIG. 1, Internet Server 100 comprises main or Central Processing Unit (CPU) 305 connected to Main Memory 335, Display Adapter 320, Secondary Storage Interface 325, and Network Adapter 310. These system components are interconnected through the use of System Bus 330.

Internet Server 100 utilizes well-known storage management and virtual addressing mechanisms. Therefore, while the programs and data of Internet server 100 are shown to reside in main memory 340, those skilled in the art will recognize that these programs/data are not necessarily all completely contained in main memory 340 at the same time. (Accordingly, the term computer system memory is used herein to generically refer to the entire storage space of Internet Server 100.)

Database 355 is that known in the industry as IBM DB/2 for iSeries, and the block representing Database 355 should be taken to mean the DB/2 engine and the stored data. W4 Server 350 of the preferred embodiment, which is the predominant mechanism within the overall W4 Facility, has already been discussed from a message passing perspective, and is described further in connection with the forthcoming drawings.

Operating system 340 of the preferred embodiment is the multitasking operating system known in the industry as OS/400. Display Adapter 320 is used to directly connect a display monitor to Internet Server 100. Secondary Storage Adapter 325 is used to connect hard disk drives and/or other types of secondary storage (e.g., magnetic tape) to Internet Server 100. Network Adapter 310 is used to connect other computer systems and/or workstations to Internet Server 100 in networked fashion.

It is important to note that while the present invention has been (and will continue to be) described in the context of a complete system, the mechanisms of the present invention are capable of being distributed in program product form. Of course, it is well understood that a program product can be distributed on different types of signal bearing media, including, but not limited to: recordable-type media such as floppy disks and CD ROMs; and transmission-type media such as digital and analog communications links.

Figure 4A:
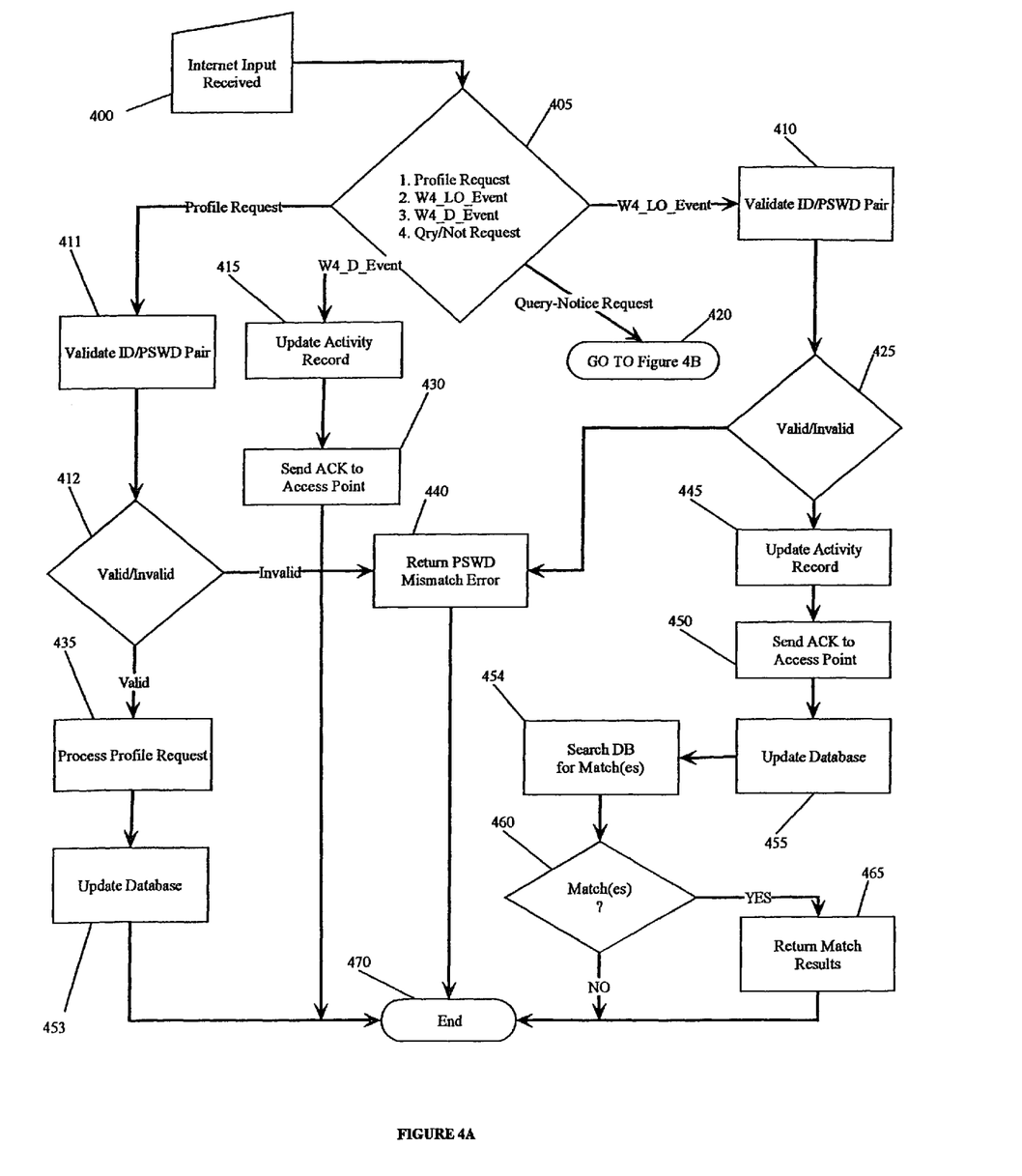
FIGS. 4A and 4B are flow diagrams which depict the steps used to carry out the server-based function of the information supply facility of the preferred embodiment of the present invention.
Figure 4B:
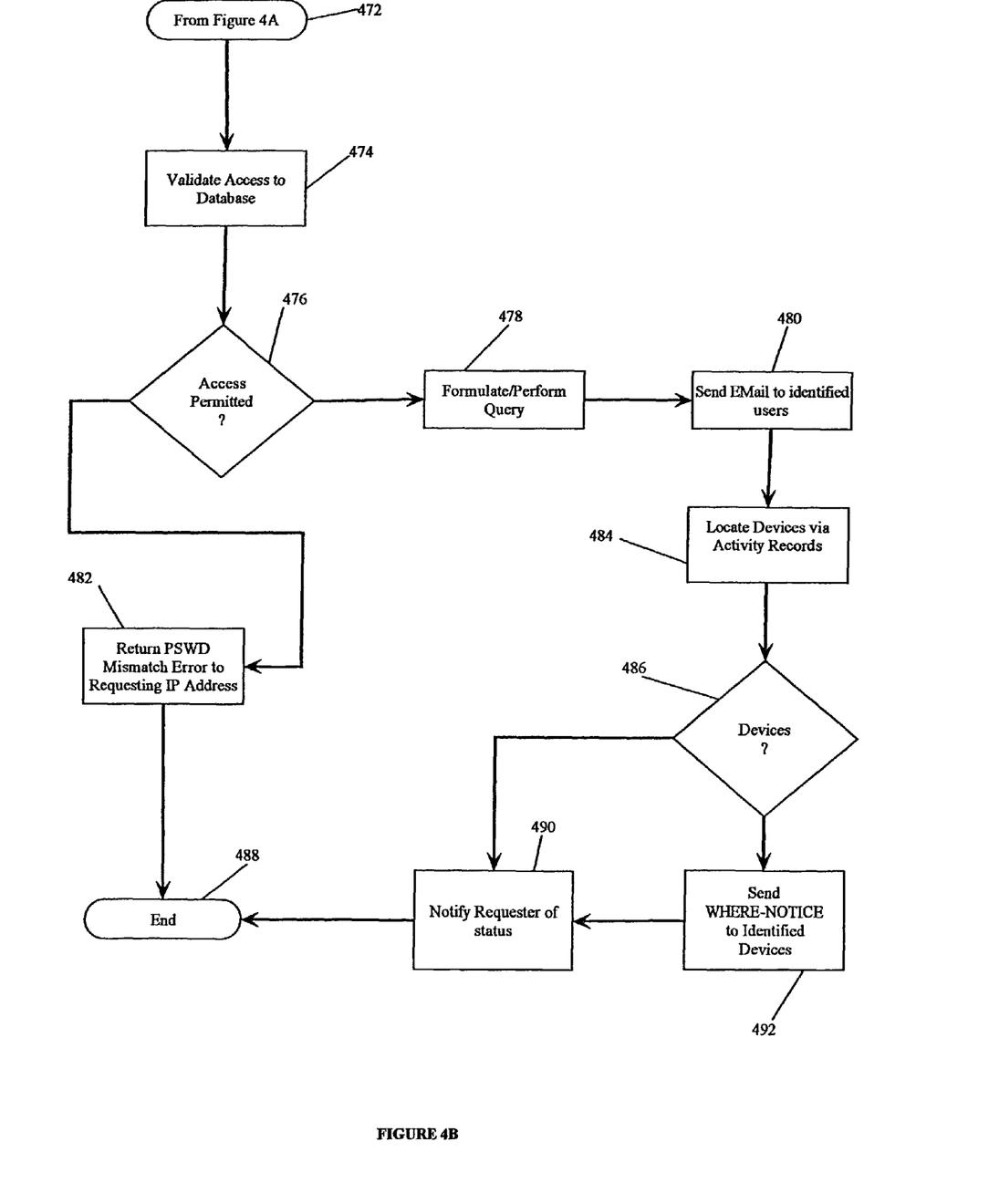

FIGS. 4A and 4B are flow diagrams which depict the steps used to carry out the server-based function of the W4 Facility of the preferred embodiment. When internet input is received in block 400, a decision is made in block 405 based on the type of input involved. As shown, W4 Server 350 expects the input to be in the form of a Profile Request, a W4_LO_Event, a W4_D_Event, or a Query-Notice Request. The text associated with FIGS. 2A and 2B contained a high level discussion of how W4 Server 350 processes W4_LO_Events and W4_D_Events; however, more detail is provided here.

A Profile Request means that a user wants to create, update, or delete a profile. The Profile Request includes the user's ID and password, the action to be taken (i.e., create, update, or delete), and the information necessary to satisfy the request.

A user can take these actions through any type of internet-connected device (e.g., User Device 140). If a Profile Request is received, W4 Server 350 first extracts the user ID/password pair from the Profile Request message and validates it [block 411]. If the ID/password pair is invalid, W4 Server 350 returns a password mismatch error to the sender [block 440]. If the ID/password pair is valid, the Profile Request is processed in block 435.

Figure 5:
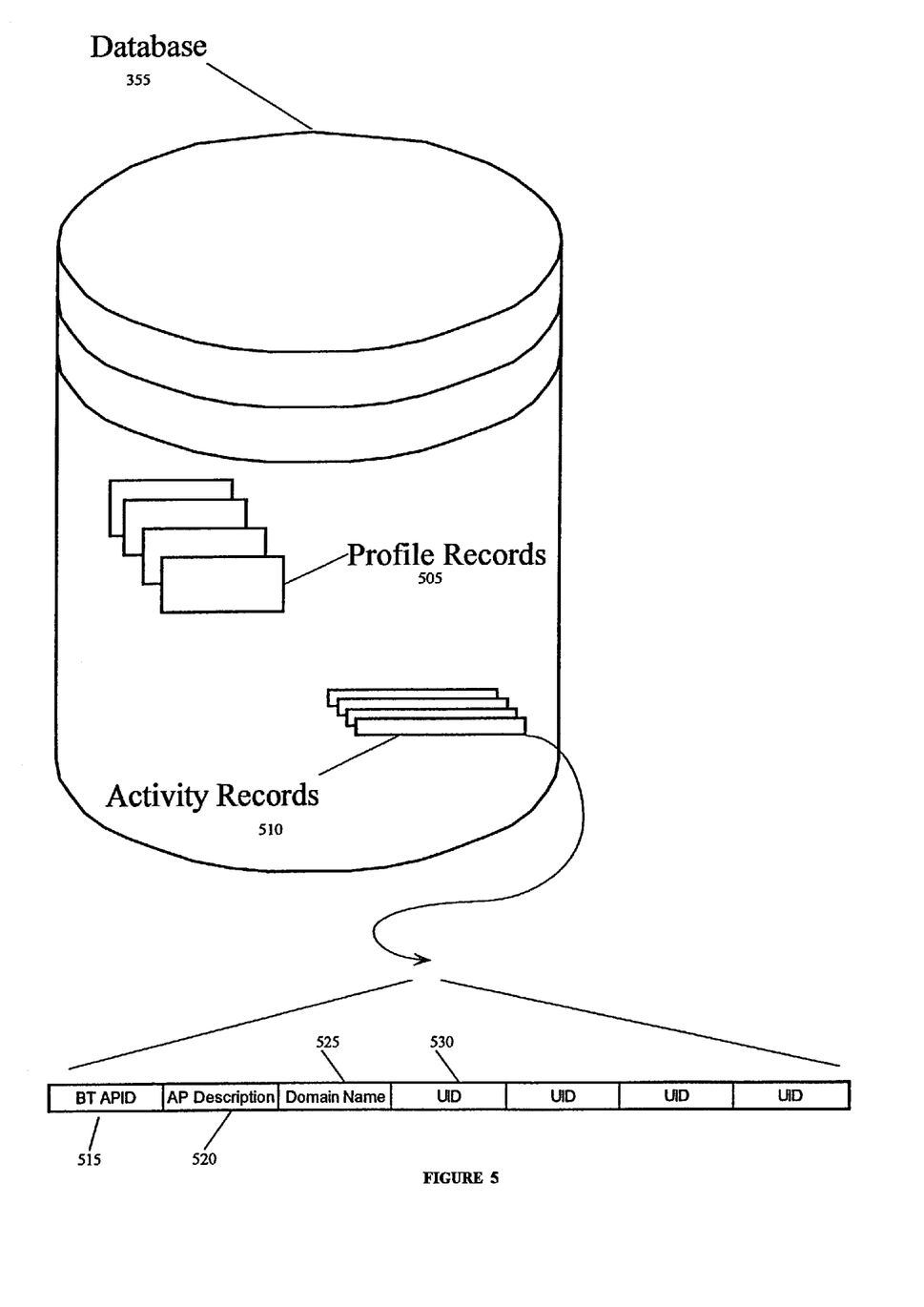
FIG. 5 shows certain records and an activity record format, both used in the preferred embodiment of the present invention.
Figure 6:
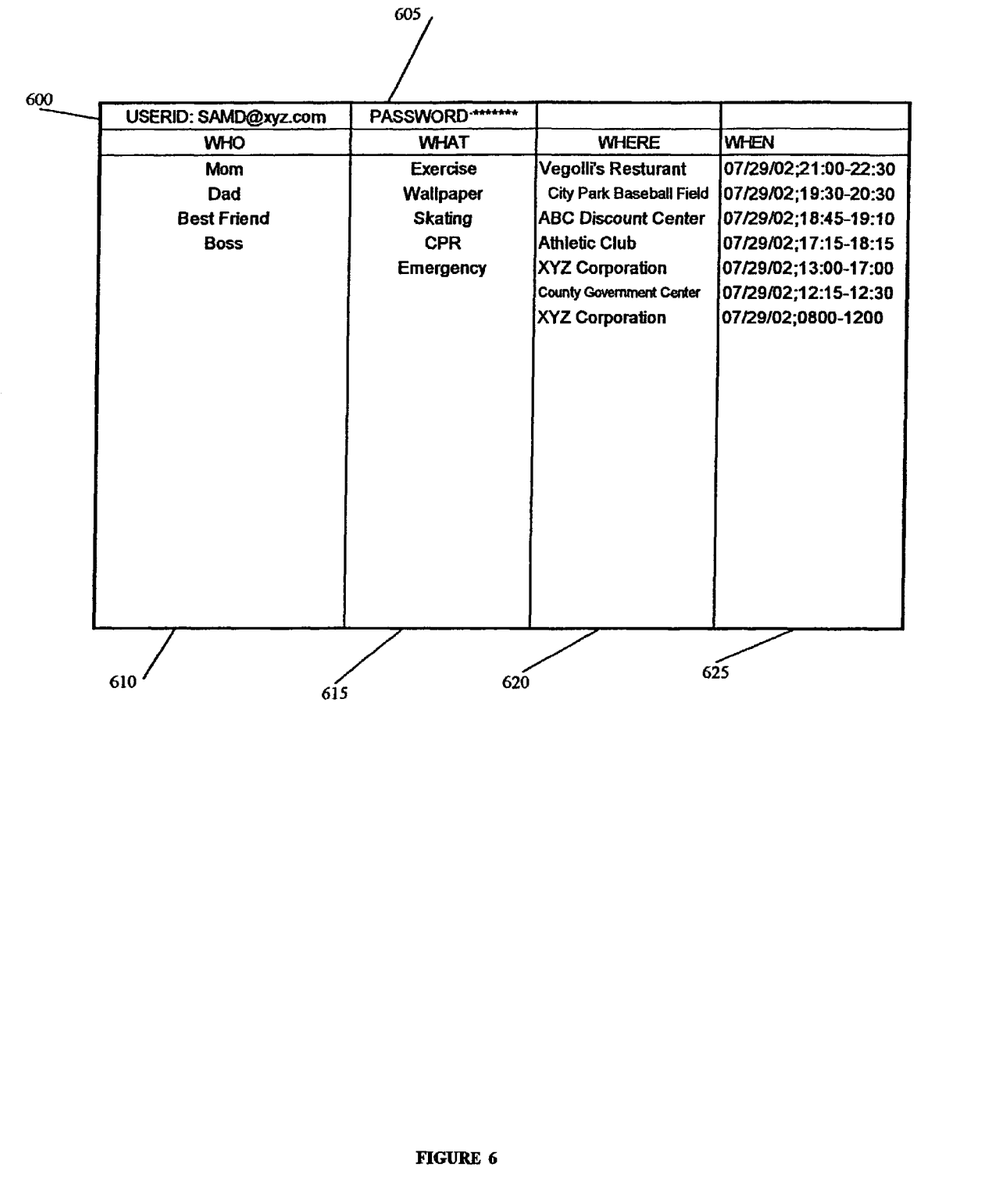
FIG. 6 shows the profile record format used in the preferred embodiment of the present invention.

As shown on FIG. 5, profile records are stored within Database 355. FIG. 6 shows the format of the profile record used in the preferred embodiment. The record has four basic components, these are aptly named WHO, WHAT, WHEN, and WHERE. The WHO and WHAT entries are specified by the user. For example, the example profile record of FIG. 6, for a fictitious user named SAMD, indicates that this particular user is interested in receiving WHO notices regarding Mom, Dad, a Boss, and a Best Friend. The example profile also tells us that the user is interested in receiving WHAT notices on subjects pertaining to Exercise, Wallpaper, Skating, CPR, and Emergencies. The WHERE and WHEN entries are created and updated by W4 Server 350 itself. These entries basically track the date, time, and location of a user's movements. This information is used by W4 Server 350 to generate WHERE notices. All of these notices are explored in further detail in the upcoming text. In any case, once the user's Profile Request is handled in block 435, Database 355 is updated accordingly in block 453. Processing of W4 Server 350 then ends in block 470.

If the received internet input is a W4_LO_Event, W4 Server 350 first extracts the user ID/password pair from the message and validates it. If the ID/password pair is invalid, W4 Server 350 returns a password mismatch error to the sender [block 440]. If the ID/password pair is valid, W4 Server 350 updates the activity record associated with the sending access point. FIG. 5 shows the format of the activity records of the preferred embodiment. As shown, activity records 510 include a series of fields, all of which are provided to Internet Server 100 in the W4_LO_Event. BT APID 515, which stands for Bluetooth access point identifier, is the unique Bluetooth identifier for the sending access point. AP Description 520 (Access Point Description) is a textual description that is used in notice processing to convey meaningful information as to location (e.g., "Eastwood Mall— North Door"). AP IP Addr. 525 (Access Point Internet Protocol Address) is used by Internet Server 100 to communicate with the sending access point. The UID fields (e.g., UID field 530) are used to track the users who have devices currently associated with a given access point. Thus if the received W4_LO_Event is the first event for the access point identified within the message, W4 Server 350 will first create an activity record, with the BT APID, AP Description, and AP IP Addr., and then add an entry for the UID. If an activity record already exists, W4 Server 350 will simply add an entry for the new UID.

Once the activity record has been updated, W4 Server 350 searches Profile Records 505 of Database 355 for matches [Block 454]. By matches, we mean WHO and/or WHAT matches. Matches can be found in three different ways or combinations thereof. First, the profile record for the UID contained in the W4_LO_Event identifies a UID in its WHO information that corresponds to an entry in the activity record for the same access point. Second, the profile record for another entry in the activity record identifies the UID contained in the W4_LO_Event in its WHO information. Third, the profile record for the UID contained in the W4_LO_Event identifies information in one or more of its WHAT fields that corresponds to WHAT information contained in one or more profile records associated with one or more entries in the activity record for the same access point. If no matches are found, W4 Server 350 simply terminates execution in block 470. If one or more matches are found, W4 Server 350 sends the appropriate notice (i.e., WHO or WHAT) to the access point so that the access point can relay the notice to the handheld device (see FIG. 2B). In the preferred embodiment, the handheld device responds to these notices by issuing an audible tone (e.g., a "beep") and by displaying the following text.

W4 WHO NOTICE: "applicable WHO field [AP Description]"

W4 WHAT NOTICE: "applicable WHAT field [AP Description] from UID XYZ"

In the W4 WHO-NOTICE, an example WHO field for the fictitious user SAM would be "DAD." In the W4 WHAT-NOTICE, an example WHAT field would be "WALLPAPER," followed by the UID of the person who shares wallpaper as an interest. The AP Description is obtained from the particular activity record (see FIG. 6).

Returning now to block 405 of FIG. 4A, if the received internet input is a W4_D_Event, W4 Server 350 updates its activity record by deleting the entry within the activity record that corresponds to the UID sent in the W4_D_Event message [Block 415]. W4 Server 350 then acknowledges receipt of the disconnect event by sending a W4_D_ACK message back to the access point [block 430]. W4 Server 350 then terminates execution in block 470.

Returning again to block 405 of FIG. 4A, the last of four possible internet inputs is a Query-Notice Request. A Query-Notice Request is basically a request to the W4 Facility to query the WHERE and WHEN fields of its Profile Logs to determine if one or more of its users were at a particular location at a particular time. If so, the W4 Facility can be used to communicate certain information to those users. The information is provided to W4 Server 350 in the Query-Notice Request message. One example would be the case were a Public Health department wanted to notify effected individuals of possible ingestion of a food contaminant at a local restaurant.

To process these requests, W4 Server 350 first validates the user ID/password pair contained in the request (see block 474 of FIG. 4B). If the ID/password pair cannot be validated, W4 Server 350 returns the mismatch error to the user [block 482] and then terminates execution in block 488. If access is permitted [block 476], W4 Server 350 performs the query based on information supplied in the Query-Notice Request. Specifically, the Query-Notice Request includes the access points (via the access point ID), date and times of interest, and the notice that is to be sent to the effected user or users. W4 Server 350 then takes that information and searches the WHERE and WHEN fields of Profile Records 505. An Email note is then sent to identified users in block 480. The Email note contains the notice that was contained in the Query-Notice Request. After sending the Email note(s), W4 Server 350 proceeds to determine whether any of the effected users are currently logged on to one of the access points [block 484]. W4 Server 350 does this by searching Activity Records 510 for active users. W4 Server 350 then sends active users a WHERE-NOTICE in block 492. The WHERE-NOTICE is formatted as follows.

W4 WHERE NOTICE: "where-notice text [AP Description]"

The requester is then notified of the status of the request. That is, whether the W4 Facility found any W4 users that satisfied the request and whether those users were notified. W4 Server 350 then terminates execution in block 488.

Processing Example

The hypothetical WHERE and WHEN entries for fictitious user SAMD (see FIG. 6) will now be used to illustrate a processing example. When Sam arrives at work, at XYZ Corporation, his handheld device, now known to the access point for his building, automatically logs into the W4 Facility (see message passing of FIGS. 2A and 2B). During the morning, Sam receives a WHO-NOTICE from his handheld informing him that his Boss is also now logged onto the access point for his building meaning that his Boss is in the same communications zone (i.e., access point zone in the preferred embodiment) as Sam. Sam uses this knowledge to seek out his Boss and informally update him on the Smith account. Sam breaks for lunch around noon and leaves his building. The building access point then automatically disconnects Sam's handheld after determining that Sam's handheld is no longer within the zone. Fifteen minutes later Sam's arrives at the government center to license one of his vehicles and his handheld device automatically logs into the access point at the government center. Sam's business at the government center finishes quickly and the access point at the government center soon realizes that Sam has left its zone, causing it to disconnect the handheld from the W4 Facility. Sam, deciding that he doesn't want the W4 Facility to note his next stop, turns his handheld off.

Sam arrives back at work at 1 pm and turns his handheld back on. The access point there then automatically logs his handheld into the W4 Facility. During the next couple of hours Sam receives a few other WHO notices, which he decides to ignore because he wants to wrap up his work on the Smith account before he goes home. Just when he's at a critical juncture in his Smith account work, he receives a WHERE notice informing him that everyone in his building must exit in accordance with the scheduled fire drill. Annoyed, Sam forgets his handheld on his desk and leaves the building. Sam returns after the fire drill, happy that he did not lose his handheld, and hoping he can finish his work before the end of the day.

Sam finishes his work on time, meaning that he now has time to work out and run an errand before meeting some friends at tonight's baseball game. The access point at work disconnects Sam's handheld from the W4 Facility shortly after he leaves his building. As he arrives at the Athletic Club he receives a WHAT notice indicating that another person who shares his interest in Biking is also at the Athletic Club. Since Sam has this person's Email address (i.e., same as UID in preferred embodiment), Sam decides to send this person an Email note later. He also receives a WHO notice, which informs him that his best friend is also now at the Athletic Club. Wondering, Sam finds his friend and learns that she had come to tell him that she would not make tonight's baseball game. They agree to meet at their favorite restaurant, Vegolli's, for a late dinner.

Sam leaves the Athletic Club and stops at the ABC Discount Center for some paint. As Sam enters the store, he receives a WHAT notice indicating that the store is currently running a special on Wallpaper. His receipt of this WHAT notice is attributable to the fact that Sam specified wallpaper as an interest in the WHAT information of his profile. Since Sam in fact needs some wallpaper, he buys some before leaving the store. Sam does not receive any notices while at the baseball game or during dinner with his friend. Sam heads home after dinner and decides to check his Email before retiring for the night. In his inbox, Sam finds a WHERE notice from the Public Health Department regarding possible salmonella exposure from a previous meal at Vegolli's. Sam calls his best friend to make sure she is aware of the potential problem. As Sam drifts off to sleep, he wonders what he would do without the W4 Facility.

Privacy

The present invention, as illustrated by the description of the preferred embodiment, provides an excellent way in which to track the movements of individuals who are connected to the W4 Facility. It should be understood, however, that participation is wholly voluntary. Users can simply turn off their hand devices, thereby preventing the W4 Facility from tracking the user's movements. Additionally, a further embodiment of the W4 Facility could limit access to certain WHERE and WHEN entries to certain users (or by user class).

Considerations—Placement, Range, and Environment

When implementing embodiments of the present invention, the developer must be mindful of where access points are placed to best accommodate the range of handheld devices and the overall environment. For example, a shopping mall implementation would be different than an office building implementation, an airport implementation would be different than an athletic club implementation, and so on. An access point zone cannot be too large because users may receive too much information, and/or received information may pertain to something (a person or place) that is located too far away to be valuable. On the other hand, an access point zone cannot be too small because the user would receive few if any notices. One way to avoid this problem is by grouping or linking activity records sensibly given the environment at issue. For example, shopping mall activity records for all of the access points at a shopping mall could be grouped based on notice type and mall section so that users could receive WHO notices based upon others who are present at nearby access points, but only receive WHAT notices based upon current access point.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A computer-implemented method, said method comprising the steps of:

creating profile information on a centralized server, said profile information including at least one topic of interest;

transmitting a request to initiate processing of an information supply facility, said request to initiate processing being sent from a local server to a plurality of access points;

repeatedly transmitting inquiry messages, said inquiry messages being repeatedly transmitted by each of said plurality of access points;

receiving at one of said access points, a log-on request from a first handheld device, said log-on request indicating that said first handheld device is present within a communications zone of said access point;

relaying said log-on request from said access point to said centralized server, said log-on request containing first user information and first password information;

confirming, at said centralized server, that said first user information and said first password information within said log-on request are valid;

querying said profile information to determine whether said profile information contains a topic of interest that is common to said first handheld device and to a second handheld device, said second handheld device also being present within said communications zone; and transmitting a first notice to said first handheld device via said access point, said first notice specifying said common topic of interest and said second user information, said second user information being associated with said second handheld device.

2. The computer-implemented method of claim 1 further comprising the step of transmitting a second notice to said second handheld device via said access point, said second notice specifying said common topic of interest and said first user information.

3. A computer-implemented method, said method comprising the steps of:

transmitting a request to initiate processing of an information supply facility, said request to initiate processing being sent from a local server to a plurality of access points;

repeatedly transmitting inquiry messages, said inquiry messages being repeatedly transmitted by each of said plurality of access points;

receiving at one of said access points a log-on request from a handheld device, said handheld device being associated with a user, said log-on request indicating that said handheld device is present within a communications zone of said access point;

relaying said log-on request from said access point to said centralized server, said log-on request containing user information, password information, and access point information;

confirming, at said centralized server, that said user information and said password information within said log-on request are valid;

grouping said access point information with said user information and a current date and time, and storing such grouped information on said centralized server as profile information;

querying said profile information based upon a specified access point and upon a specified time and date; and transmitting a notice to said user, said notice containing information about said specified access point and said specified time and date.

4. The method of claim 3 wherein said transmitting step further comprises sending said notice to at least one of said handheld device and an Email address for said user.

5. A computer-implemented method, said method comprising the steps of:

receiving an indication that a first handheld device is present within a communications zone;

transmitting information about said indication to a server;

querying previously created profile information to determine whether said profile information contains a topic of interest that is common to said first handheld device and to a second handheld device, said second handheld device also being present within said communications zone; and transmitting a first notice to said first handheld device, said first notice specifying said common topic of interest and said second user information, said second user information being associated with said second handheld device.

6. The computer-implemented method of claim 5 further comprising the step of transmitting a second notice to said second handheld device, said second notice specifying said common topic of interest and said first user information.

7. A computer-implemented method, said method comprising the steps of:

receiving an indication that a handheld device is present within a communications zone;

transmitting information about said indication to a server, said information containing information about said communications zone and about a user associated with said handheld device;

grouping said information and a current date and time, and storing such grouped information as profile information;

querying said profile information based upon a specified communications zone information and upon a specified time and date; and transmitting a notice to said user, said notice containing information about said specified access point and said specified time and date.

8. The method of claim 7 wherein said transmitting step further comprises sending said notice to at least one of said handheld device and an Email address for said user.

9. A computer-implemented method, said method comprising the steps of:

receiving at a server an indication that a first handheld device is present within a communications zone;

querying previously created profile information to determine whether said profile information contains a topic of interest that is common to said first handheld device and to a second handheld device, said second handheld device also being present within said communications zone; and transmitting a first notice to said first handheld device, said first notice specifying said common topic of interest and said second user information, said second user information being associated with said second handheld device.

10. The computer-implemented method of claim 9 further comprising the step of transmitting a second notice to said second handheld device, said second notice specifying said common topic of interest and said first user information.

11. A computer-implemented method, said method comprising the steps of:

receiving at a server an indication that a handheld device is present within a communications zone, said information containing information about said communications zone and about a user associated with said handheld device;

grouping said information and a current date and time, and storing such grouped information as profile information;

querying said profile information based upon a specified communications zone information and upon a specified time and date; and transmitting a notice to said user, said notice containing information about said specified access point and said specified time and date.

12. The method of claim 11 wherein said transmitting step further comprises sending said notice to at least one of said handheld device and an Email address for said user.

13. A computer-implemented method, said method comprising the steps of:

receiving at an access point an indication that a first handheld device is present within a communications zone for said access point, said first handheld device being associated with a first user;

transmitting said indication to a server, said indication including first user information; and receiving a first notice from said server, said first notice specifying a common topic of interest between said first user and a second user, said first notice also specifying second user information, said second user information being associated with a second handheld device that is also within said communications zone.

14. The computer-implemented method of claim 13 further comprising the step of transmitting a second notice to said second handheld device, said second notice specifying said common topic of interest and said first user information.

15. A computer-implemented method, said method comprising the steps of:
receiving at an access point an indication that a handheld device is present within a communications zone of said access point;
transmitting information about said indication to a server, said information containing information about said communications zone and about a user associated with said handheld device;
receiving a notice, said notice containing information about a specific access point and a specific time and date; and
transmitting said notice to said handheld device.

16. A computer-implemented method, said method comprising the steps of:
transmitting, by a first handheld device, an indication that said first handheld device is present within a communications zone, said first handheld device being associated with a first user, said indication including first user information; and
receiving a notice from said server specifying a common topic of interest between said first user and a second user, said notice also specifying second user information, said second user information being associated with a second handheld device that is also within said communications zone.

17. The computer-implemented method of claim 16 wherein said second handheld device entered said communications zone prior to said first handheld device.

18. The computer-implemented method of claim 16 wherein said second handheld device entered said communications zone after said first handheld device.

19. A program product, said program product comprising:
recordable memory; and an information supply facility stored on said recordable memory,
said information supply facility being configured to perform the following steps,
creating profile information on a centralized server, said profile information including at least one topic of interest;
transmitting a request to initiate processing of an information supply facility, said request to initiate processing being sent from a local server to a plurality of access points;
repeatedly transmitting inquiry messages, said inquiry messages being repeatedly transmitted by each of said plurality of access points;
receiving at one of said access points, a log-on request from a first handheld device, said log-on request indicating that said first handheld device is present within a communications zone of said access point;
relaying said log-on request from said access point to said centralized server, said log-on request containing first user information and first password information;

confirming, at said centralized server, that said first user information and said first password information within said log-on request are valid;
querying said profile information to determine whether said profile information contains a topic of interest that is common to said first handheld device and to a second handheld device, said second handheld device also being present within said communications zone; and
transmitting a first notice to said first handheld device via said access point, said first notice specifying said common topic of interest and said second user information, said second user information being associated with said second handheld device.

20. The program product of claim 19 wherein said information supply facility is further configured to perform the step of transmitting a second notice to said second handheld device via said access point, said second notice specifying said common topic of interest and said first user information.

21. A program product, said program product comprising:
recordable memory; and an information supply facility stored on said recordable memory,
said information supply facility being configured to perform the following steps,
transmitting a request to initiate processing of an information supply facility, said request to initiate processing being sent from a local server to a plurality of access points;
repeatedly transmitting inquiry messages, said inquiry messages being repeatedly transmitted by each of said plurality of access points;
receiving at one of said access points a log-on request from a handheld device, said handheld device being associated with a user, said log-on request indicating that said handheld device is present within a communications zone of said access point;
relaying said log-on request from said access point to said centralized server, said log-on request containing user information, password information, and access point information;
confirming, at said centralized server, that said user information and said password information within said log-on request are valid;
grouping said access point information with said user information and a current date and time, and storing such grouped information on said centralized server as profile information;
querying said profile information based upon a specified access point and upon a specified time and date; and
transmitting a notice to said user, said notice containing information about said specified access point and said specified time and date.

22. The program product of claim 21 wherein said transmitting step of said information supply facility further comprises sending said notice to at least one of said handheld device and an Email address for said user.

23. A program product, said program product comprising:
recordable memory; and an information supply facility stored on said recordable memory,
said information supply facility being configured to perform the following steps,
receiving an indication that a first handheld device is present within a communications zone;
transmitting information about said indication to a server;
querying previously created profile information to determine whether said profile information contains a topic of interest that is common to said first handheld device and to a second handheld device, said second handheld device also being present within said communications zone; and transmitting a first notice to said first handheld device, said first notice specifying said common topic of interest and said second user information, said second user information being associated with said second handheld device.

24. The program product of claim 23 wherein said information supply facility is further configured to perform the step of transmitting a second notice to said second handheld device, said second notice specifying said common topic of interest and said first user information.

25. A program product, said program product comprising:
recordable memory; and an information supply facility stored on said recordable memory,
said information supply facility program being configured to perform the following steps,
  receiving an indication that a handheld device is present within a communications zone;
  transmitting information about said indication to a server, said information containing information about said communications zone and about a user associated with said handheld device;
  grouping said information and a current date and time, and storing such grouped information as profile information;
  querying said profile information based upon a specified communications zone information and upon a specified time and date; and
  transmitting a notice to said user, said notice containing information about said specified access point and said specified time and date.

26. The program product of claim 25 wherein said transmitting step of said information supply facility further comprises sending said notice to at least one of said handheld device and an Email address for said user.

27. A program product, said program product comprising:
recordable memory; and a server stored on said recordable memory,
said server being configured to perform the following steps,
  receiving an indication that a first handheld device is present within a communications zone;
  querying previously created profile information to determine whether said profile information contains a topic of interest that is common to said first handheld device and to a second handheld device, said second handheld device also being present within said communications zone; and
  transmitting a first notice to said first handheld device, said first notice specifying said common topic of interest and said second user information, said second user information being associated with said second handheld device.

28. The program product of claim 27 wherein said server is further configured to perform the step of transmitting a second notice to said second handheld device, said second notice specifying said common topic of interest and said first user information.

29. A program product, said program product comprising:
recordable memory; and a server stored on said recordable memory,
said server being configured to perform the following steps,
  receiving an indication that a handheld device is present within a communications zone, said information containing information about said communications zone and about a user associated with said handheld device;
  grouping said information and a current date and time, and storing such grouped information as profile information;
  querying said profile information based upon a specified communications zone information and upon a specified time and date; and
  transmitting a notice to said user, said notice containing information about said specified access point and said specified time and date.

30. The method of claim 29 wherein said transmitting step of said server further comprises sending said notice to at least one of said handheld device and an Email address for said user.

31. A program product, said program product comprising:
recordable memory; and an access point program stored on said recordable memory,
said access point program being configured to perform the following steps,
  receiving an indication that a first handheld device is present within a communications zone for said access point, said first handheld device being associated with a first user;
  transmitting said indication to a server, said indication including first user information; and
  receiving a first notice from said server, said first notice specifying a common topic of interest between said first user and a second user, said first notice also specifying second user information, said second user information being associated with a second handheld device that is also within said communications zone.

32. The program product of claim 31 wherein said access point program is further configure to perform the step of transmitting a second notice to said second handheld device, said second notice specifying said common topic of interest and said first user information.

33. A program product, said program product comprising:
recordable memory; and an access point program stored on said recordable memory,
said access point program being configured to perform the following steps,
  receiving an indication that a handheld device is present within a communications zone of said access point;
  transmitting information about said indication to a server, said information containing information about said communications zone and about a user associated with said handheld device;
  receiving a notice, said notice containing information about a specific access point and a specific time and date; and
  transmitting said notice to said handheld device.

34. A program product, said program product comprising:
recordable memory; and a handheld device program stored on said recordable memory,
said handheld device program being configured to perform the following steps,
  transmit an indication that said first handheld device is present within a communications zone, said first handheld device being associated with a first user, said indication including first user information; and
  receive a notice from said server specifying a common topic of interest between said first user and a second user, said notice also specifying second user information, said second user information being associated with a second handheld device that is also within said communications zone.

35. The program product of claim 34 wherein said second handheld device entered said communications zone prior to said first handheld device.

36. The program product of claim 34 wherein said second handheld device entered said communications zone after said first handheld device.

* * * * *